United States Patent
Habel et al.

(10) Patent No.: US 10,035,233 B2
(45) Date of Patent: Jul. 31, 2018

(54) METHOD AND APPARATUS FOR MANUFACTURING A TRANSMISSION CASE

(71) Applicant: Ford Motor Company, Dearborn, MI (US)

(72) Inventors: Michael Joseph Habel, Ann Arbor, MI (US); Gregory S. Carlone, Novi, MI (US)

(73) Assignee: Ford Motor Company, Dearborn, MI (US)

( * ) Notice: Subject to any disclaimer, the term of this patent is extended or adjusted under 35 U.S.C. 154(b) by 329 days.

(21) Appl. No.: 15/134,829

(22) Filed: Apr. 21, 2016

(65) Prior Publication Data

US 2017/0304977 A1    Oct. 26, 2017

(51) Int. Cl.

| B23Q 11/10 | (2006.01) |
|---|---|
| B23P 13/02 | (2006.01) |
| F16H 57/02 | (2012.01) |
| B23Q 11/00 | (2006.01) |

(52) U.S. Cl.
CPC .......... *B23Q 11/1046* (2013.01); *B23P 13/02* (2013.01); *B23Q 11/005* (2013.01); *F16H 57/02* (2013.01); *B23Q 11/0075* (2013.01); *Y02P 70/169* (2015.11); *Y02P 70/171* (2015.11); *Y10T 408/5614* (2015.01); *Y10T 409/30896* (2015.01); *Y10T 483/10* (2015.01)

(58) Field of Classification Search
CPC .............. B23Q 11/1046; B23Q 11/005; B23Q 11/0053; B23Q 11/006; B23Q 11/0075; Y10T 483/10; Y10T 408/5614; Y10T 408/5616; Y10T 409/307504; Y10T 409/30896

See application file for complete search history.

(56) References Cited

U.S. PATENT DOCUMENTS

| 3,795,957 | A | * | 3/1974 | Steusloff | ........... B23B 29/03446 |
|---|---|---|---|---|---|
| | | | | | 29/566 |
| 3,822,959 | A | * | 7/1974 | Tabard | ................. B23Q 1/4804 |
| | | | | | 408/234 |
| 6,682,276 | B2 | * | 1/2004 | Harami | ................ B23Q 1/4857 |
| | | | | | 160/202 |

(Continued)

FOREIGN PATENT DOCUMENTS

| DE | 19606156 A1 * | 8/1997 | ............... B08B 3/02 |
|---|---|---|---|
| DE | 102005022197 A1 | 11/2006 | |

(Continued)

*Primary Examiner* — Daniel Howell
(74) *Attorney, Agent, or Firm* — Marla Johnston; Brooks Kushman P.C.

(57) ABSTRACT

A method of manufacturing a transmission case housing is provided wherein a minimum quantity of lubrication as a compressed air/oil mist is supplied as the housing is rough bored and face milled. The transmission case defines a plurality of transmission fluid drainage holes for draining transmission fluid from the transmission when installed in a vehicle. The housing is positioned with the fluid drainage holes below a central axis of the housing and a plurality of internal bores and faces are bored and face milled on the housing. The compressed air/oil mist is sprayed from the cutting head to cool and lubricate the boring and face milling tools. Machining chips are blown off the rough bored housing through the fluid drainage holes.

18 Claims, 5 Drawing Sheets

(56) References Cited

U.S. PATENT DOCUMENTS

| | | | | |
|---|---|---|---|---|
| 6,938,633 | B2* | 9/2005 | Sugata | B23Q 39/023 137/1 |
| 6,948,894 | B2* | 9/2005 | Taga | B23Q 1/012 269/57 |
| 7,491,022 | B2* | 2/2009 | Kato | B23Q 1/287 269/71 |
| 8,555,503 | B2 | 10/2013 | Habel et al. | |
| 8,899,889 | B2* | 12/2014 | Yoshida | B23Q 1/4857 269/55 |
| 8,985,564 | B2* | 3/2015 | Stanifer | B23Q 3/069 269/281 |
| 9,950,374 | B2* | 4/2018 | Bruder | B23B 41/12 |

FOREIGN PATENT DOCUMENTS

| | | | | | |
|---|---|---|---|---|---|
| DE | 102006024407 | * | 12/2006 | | B23Q 1/012 |
| EP | 2394778 | A1 * | 12/2011 | | B23Q 1/015 |
| JP | 04283011 | A * | 10/1992 | | |
| JP | 06020713 | B2 * | 3/1994 | | |
| JP | 06277977 | A * | 10/1994 | | |
| JP | 08267337 | A * | 10/1996 | | |
| JP | 2009184056 | A * | 8/2009 | | |

\* cited by examiner

METHOD AND APPARATUS FOR MANUFACTURING A TRANSMISSION CASE

TECHNICAL FIELD

This disclosure relates to a method and machining line for manufacturing a transmission case.

BACKGROUND

Large housings for transmissions are cast and then machined to close tolerances required to mount transmission gears, clutches and other critical components. Conventional machining lines for transmission housings cool and lubricate the housing with a flood of a water/oil emulsion coolant in both the rough and finish machining steps. A considerable amount of heat is created during the rough boring and face milling operation that builds up in the housing and in the chips machined from the housing. The flood of the water/oil emulsion coolant was formerly thought to be essential to cool the housing and wash large volumes of the hot chips from the part and tool.

Large amounts of water/oil emulsion coolant necessitate large coolant circulation systems for removing chips and cooling the recirculated coolant. The coolant and chips add to the waste disposal load of a plant and increase processing costs. Water/oil emulsion coolants can be recycled. Metallic cutting chips reclaimed from the coolant can be salvaged but at a reduced value compared to chips produced in a dry metal cutting operation. Coolant circulation systems are costly and require valuable manufacturing floor space. Operation of the water/oil emulsion coolant systems uses substantial energy.

Minimum quantity lubrication (MQL) systems have been developed that provide mist lubrication in air for milling, drilling, and tapping relatively small features that are less than 200 mm in diameter of a transmission housing. The bottom area of the transmission housing that is enclosed by the transmission fluid pan is processed through milling, drilling, and tapping operations with the bottom area inverted to provide easier access. MQL systems were not developed for rough boring and finish boring machines because of the heat generated by the boring and face milling operations. The hot chips removed from the housing contribute to the heat load. Flood cooling was previously thought to be the only way to provide cooling to the housing and lubrication to the boring and face milling machines.

Dedicated boring machines having large boring bars equipped with multiple cutting tools are used to machine large housings having inner diameters to be bored and faces to be milled that are more than 200 mm in diameter, such as a rear wheel drive transmission cases, and the like. Dedicated boring bar machines are expensive to purchase and require long purchasing lead times. Dedicated boring machines require substantial time for changeover to a different part or style of part and tooling changes result in long periods of line downtime. Dedicated boring machines on a machining line are normally part of a single path line so that if the boring machine requires servicing, the entire line is shut down.

The above problems and other problems are addressed by this disclosure as summarized below.

SUMMARY

According to one aspect of this disclosure, a method of manufacturing a transmission case from an "as cast" housing is provided wherein a minimum quantity of lubrication as an oil mist in compressed air is supplied as the housing is rough bored and face milled. The transmission case is a cast housing that defines a plurality of transmission fluid drainage holes for draining transmission fluid from the transmission when installed in a vehicle. The housing is positioned with the fluid drainage holes below a central axis of the as cast housing and a plurality of internal bores and faces are bored and face milled on the housing to form a rough bored housing. Machining chips are blown off the rough bored housing through the fluid drainage holes and through the bell-shaped end of the housing. Machining chips are also blown off by the turbulent air flow created by rotation of the tool as the tool is retracted from the housing.

According to other aspects of this disclosure, the step of boring and face milling the internal bores and faces may further comprise supplying a machine tool cutting head with a flow of compressed air and an oil mist through an internal passage in the cutting head. The compressed air and an oil mist are sprayed from the cutting head to cool and lubricate the boring and face milling tools. Compressed air supplied through the cutting head without the oil mist is also used to cool the housing.

The cast housing may include a bell-shaped end and a rear end. The compressed air and oil mist are allowed to flow when the cutting head is within the cast housing and are inhibited during a tool change operation when the cutting head is outside the housing. Chips formed during the boring and face milling operations are blown off the machined housing through the bell-shaped end and the fluid drainage holes in the housing during and after boring and face milling a plurality of internal bores and a plurality of faces on the cast housing.

The method may further comprise machining a plurality of datums and locating the rough machined housing on the datums with the drainage holes above a central axis of the cast housing. The rough machined housing is further bored and milled with finish boring and face milling tools that are also provided with the compressed air and an oil mist through the machine tool cutting head.

The cast housing may include a bell-shaped end and a rear end. The cast housing is initially positioned with the bell-shaped end facing a machine tool arbor and then is repositioned with the rear end facing the machine tool arbor. A rear bore of the cast housing is then bored and face milled.

The step of boring and face milling a plurality of internal bores and a plurality of faces of the cast housing to form a rough machined housing may be performed by a computer numerically controlled machining center with a tool magazine.

The step of boring and face milling a plurality of internal bores and a plurality of faces of the cast housing is performed by boring tools and interpolated face milling tools that perform the facing milling operations.

According to another aspect of this disclosure, a machining center is disclosed for machining a housing that comprises a fixture, a plurality of interchangeable tools and a compressed air/oil mist lubrication system. The fixture holds the housing that defines a plurality of fluid drainage holes disposed below a central axis of the housing. Interchangeable tools are provided for boring and face milling a plurality of bores and faces of the housing. The air/oil mist lubrication system lubricates and cools the interchangeable tools while boring and face milling the housing and also blows machining chips off the housing through the fluid drainage holes.

According to other aspects of this disclosure as it relates to a machining center, the air/oil mist lubrication system may include flow channels defined by the interchangeable tools. The air/oil mist lubrication system may include a controller that allows the air/oil mist to flow when the interchangeable tool is inside the housing and inhibits the flow of air/oil mist during a tool change. The air/oil mist lubrication system blows machining chips off the housing after the interchangeable tool is retracted from the housing. The air/oil mist flow rates are adjustable and could be varied for each different type of cutting tool used to machine the cast housing.

The housing may include a bell-shaped end and a rear end, and the machining center may further comprise a positioner, or trunnion, adapted to change the orientation of the housing. The positioner holds the bell-shaped end of the housing facing the machine tool arbor when a plurality of internal bores and faces are bored and face milled, and positions the rear end facing the machine tool arbor when the rear bore of the housing is bored and face milled.

The above aspects of this disclosure and other aspects are described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
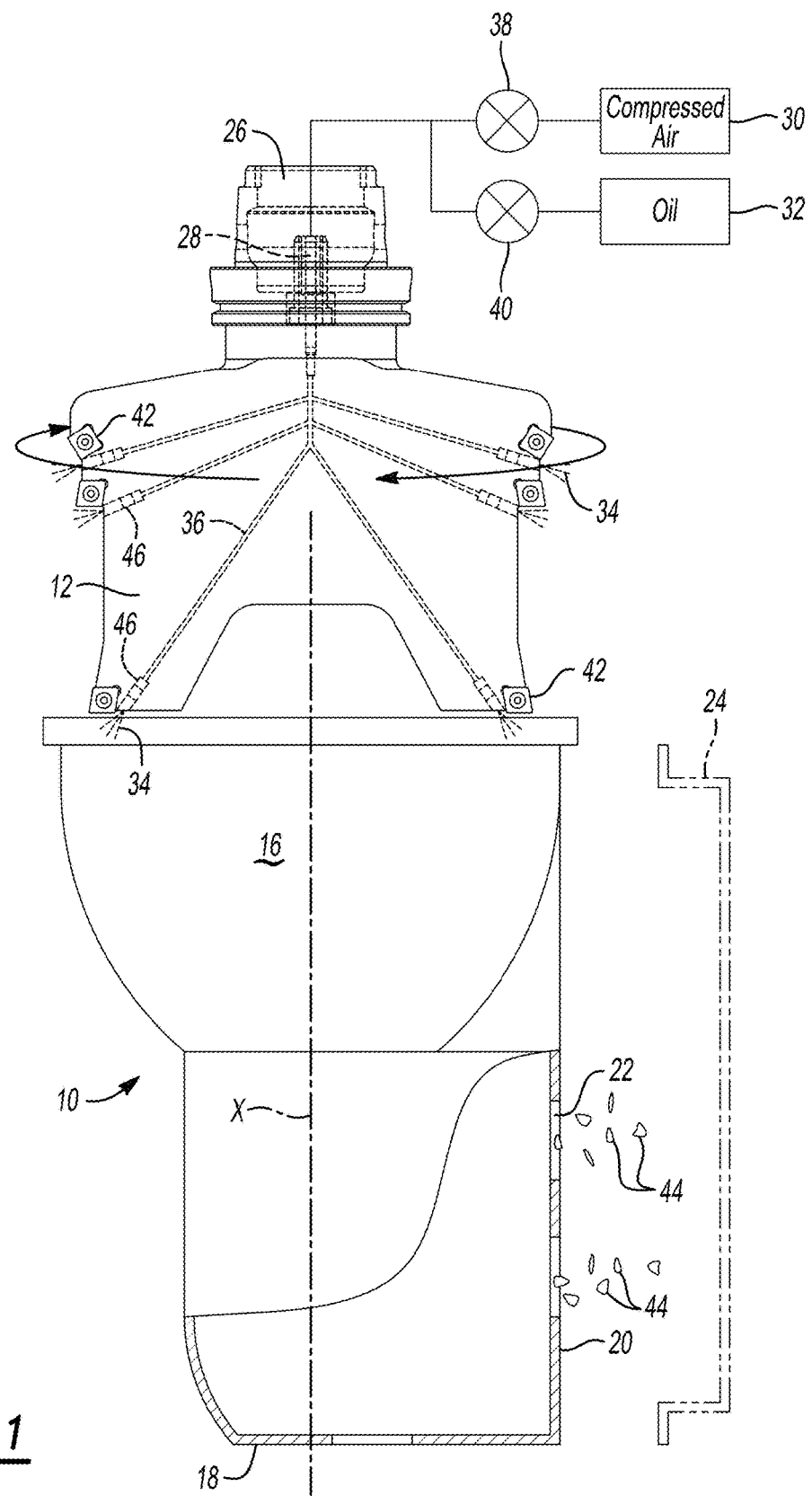
FIG. 1 is a side elevation view partially exploded away of a rear wheel drive transmission housing and a boring tool.

Referring to FIG. 1, a rear wheel drive (RWD) transmission housing 10 is illustrated with a boring tool 12, which may also be referred to herein as a boring and milling tool or an interchangeable tool. The tool 12 has a larger length to diameter ratio of up to 2.5/1 to facilitate reaching into the housing 10. In addition, the spindle of the CNC machining center is used to reach into the housing 10 from the bell end 16 to minimize the overall length of the boring tools 12. The housing 10 has a bell-shaped end 16, or bell end, and a back end 18. The gear sets, clutches and other components of the transmission (not shown) are assembled into the bell end 16 and the drive shaft (not shown) is assembled to the back end 18. A bottom side 20 of the housing 10 defines a plurality of fluid drainage holes 22 and other openings. The fluid drainage holes are provided to allow for circulation of transmission fluid in the completed transmission. A transmission fluid pan 24 covers and encloses the bottom of the housing 10.

The housing has a central axis indicated by "X" in FIG. 1 that corresponds to the axis of the main shaft of the transmission (not shown).

The boring and face milling tool 12 is adapted to be attached to an arbor of a machining center (shown in FIG. 2) by a quick connect fitting 26. The quick connect fitting 26 defines a concentric fluid port 28 that is aligned with the axis X. A compressed air source and an oil source are connected to the tool 12 by the quick connect fitting 26 to provide a compressed air/oil mist 34 through internal passages 36 in the tool 12. The flow of air and oil mist maybe separately controlled by an air valve 38 and an oil valve 40. Compressed air supplied through the tool 12 without oil may also be used to cool the part. The fitting 26, internal passages 36, air source 30, oil source 32, air valve 38 and oil valve 40 may be generally referred to as a lubrication system.

The tool 12 is provided with a plurality of cutter inserts 42 that are used to bore and face mall the housing 10. The cutter inserts 42 cut into the housing 10 and create machining chips 44. The lubrication system cools the housing and machining chips 44 by directing the compressed air/oil mist 34 through nozzles 46 and onto the housing 10 in the area where the cutter inserts 42 are used to machine the housing 10. The compressed air/oil mist 34 cools the housing 10 and machining chips 44 during the machining operation. The compressed air/oil mist 34 also functions to blow the machining chips 44 out of the housing 10 and through the fluid drainage holes 22 and also through other openings, such as the bell-shaped end 16 of the housing 10. During a tool change the oil valve 40 and air valve 38 may be separately controlled so that both may be closed to stop spraying the air/oil mist 34. Alternatively, only the oil valve 40 may be closed to reduce or eliminate oil from the air/oil mist 34 while the tool 12 is retracted from the housing 10. In this way, the compressed air can be used to remove machining chips 44 from the housing 10 without wasting oil or spraying oil inside the machining center. Machining chips 44 are also blown off the housing 10 by the turbulent air flow created by the propeller-like action of the rotating tool 12.

Figure 2:
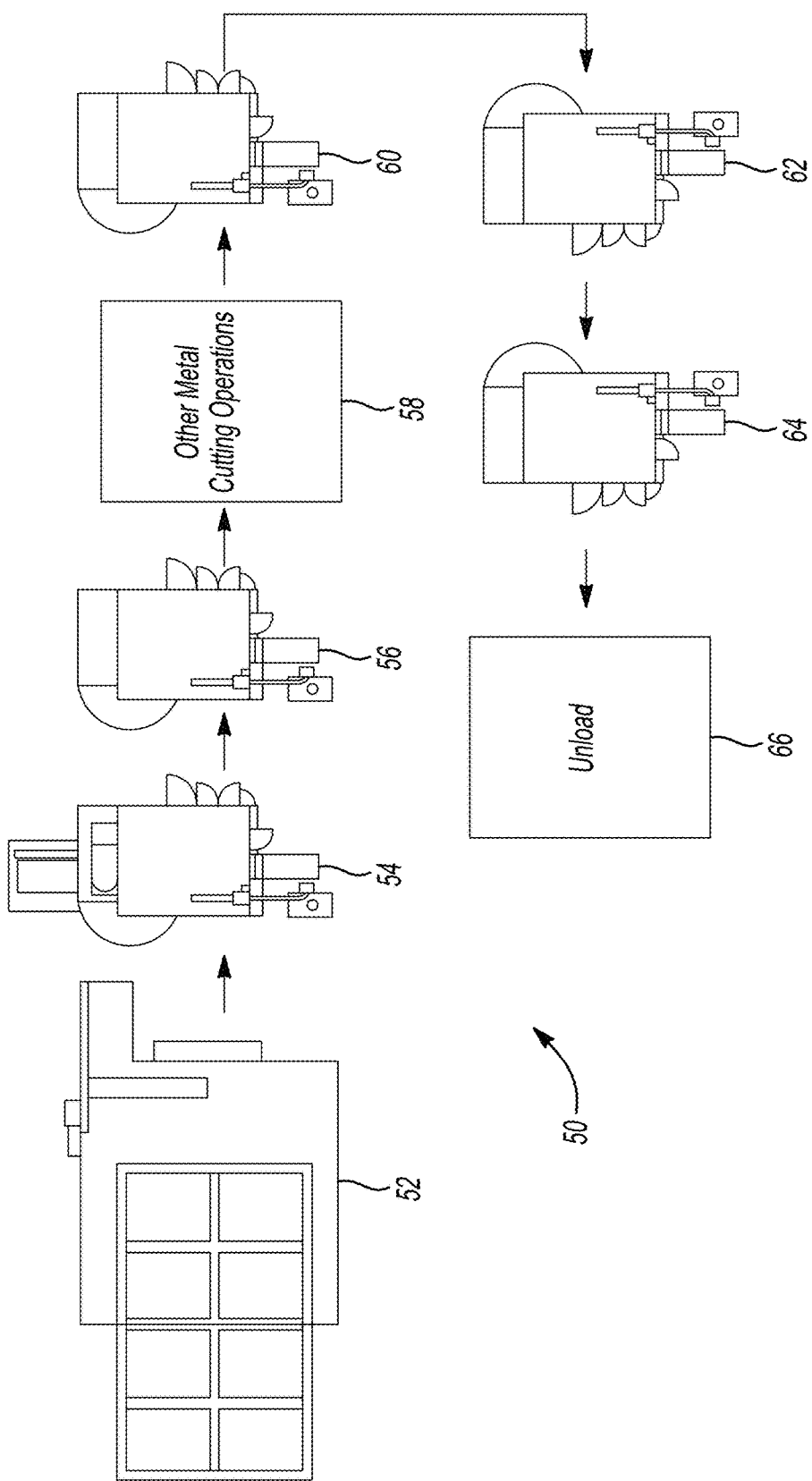
FIG. 2 is a diagrammatic view of a portion of a machining line for machining a transmission housing such as that shown in FIG. 1.
Figure 3:
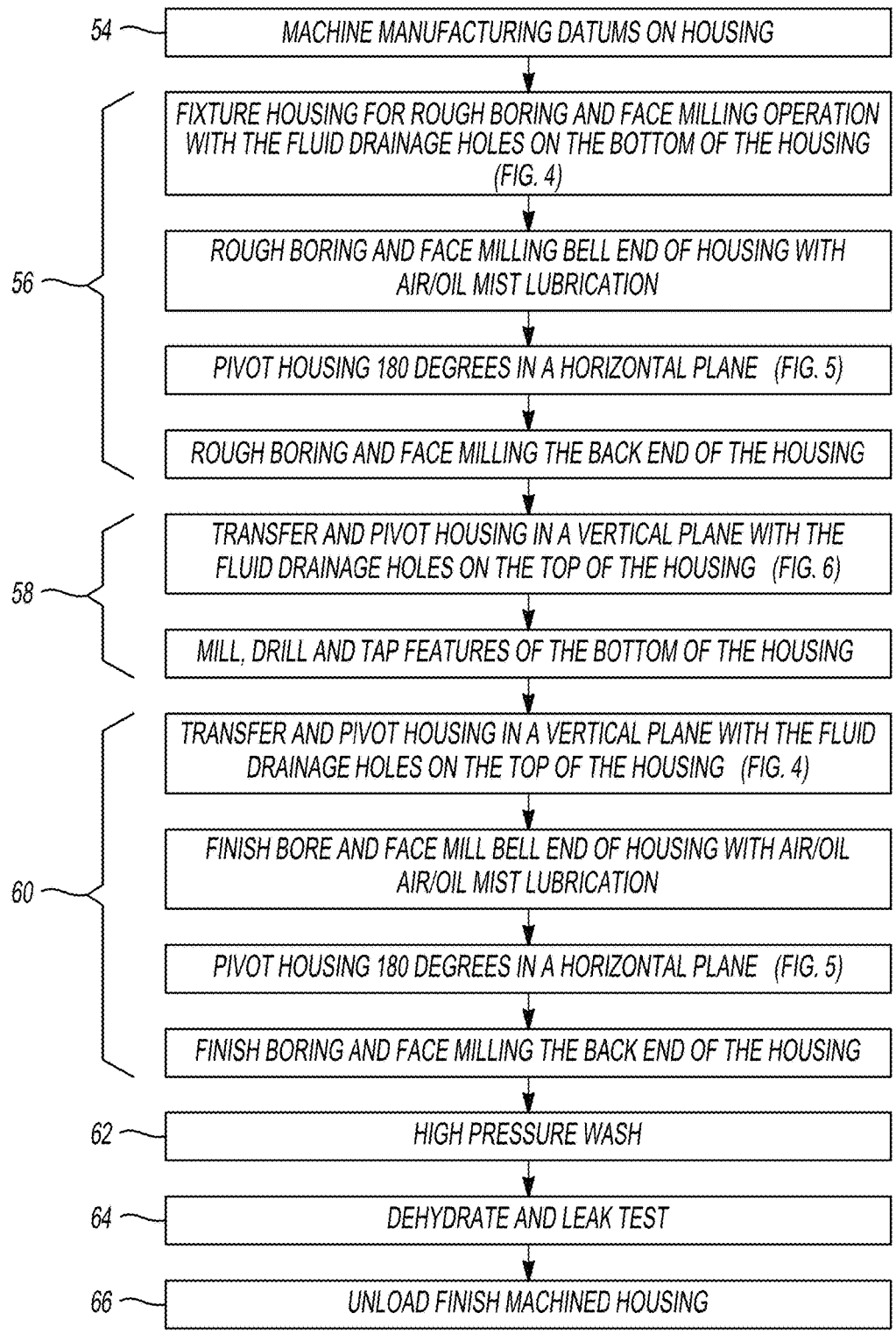
FIG. 3 is a flow chart showing the steps of a method of machining a transmission housing such as that shown in FIG. 1.

Referring to FIGS. 2 and 3, a machining line is illustrated in FIG. 2 and a flowchart describing the steps of the method is provided in FIG. 3. The first part of the machining line is a loading station 52 where an "as cast" transmission housing is provided to the machining line. The transmission housing 10 is transferred to a datum machining station 54 where datum surfaces are machined on the housing at locations where the transmission housing is to be fixtured as it proceeds through the machining line 50.

Figure 4:
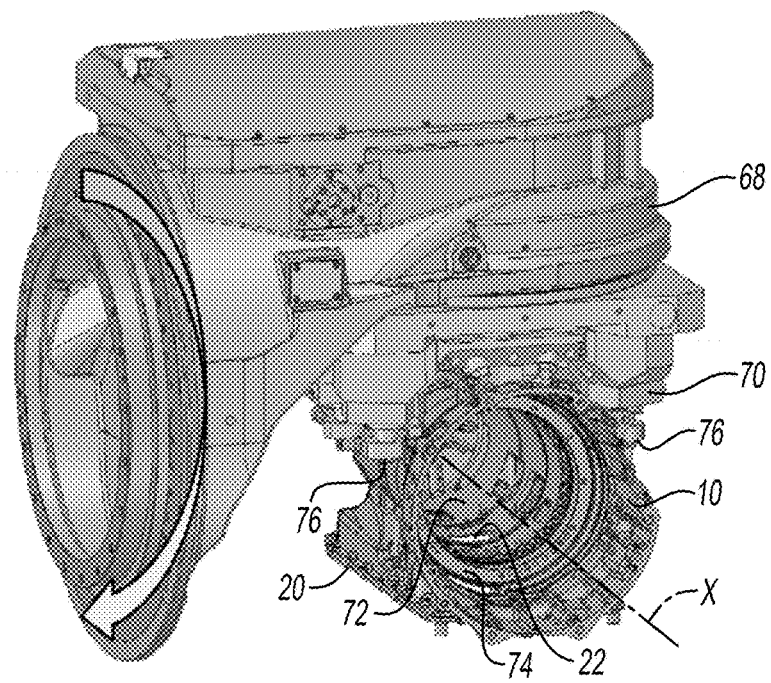
FIG. 4 is a perspective view of a trundle of a machining center holding a transmission housing in a bottom down orientation.

In the next step, at 56, the housing is rough bored and face milled in the position shown in FIG. 4 with the bottom side 20 of the housing 10 facing downward. The fluid drainage holes 22 in the bottom side 20 of the housing 10 receive the machining chips 44 and the air/oil mist 34 falls through the holes 22 as a result of the pressure from the compressed air and as a result of the force of gravity. Several boring and face milling tools may be sequentially inserted into the bell-shaped end 16 of the housing 10 to complete rough boring and rough face milling of the housing 10. The transmission housing has internal bores and faces to be milled that are between 205mm and 295mm. Boring and milling such large surfaces was previously thought to only be possible with flood cooling due to the heat generated by the large amount of material removed.

Figure 5:
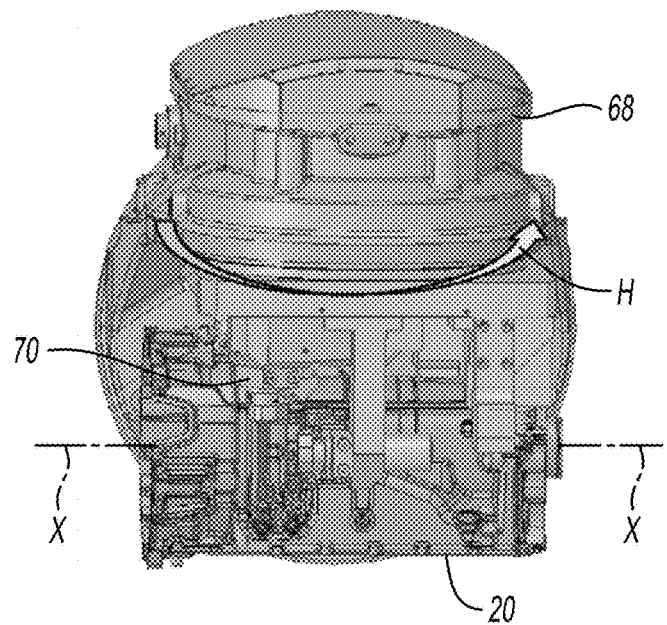
FIG. 5 is a side elevation view of the trundle of a machining center holding a transmission housing in a bottom down orientation and horizontally pivoted 180 degrees.

The housing is then repositioned inside the machining center by rotating 180° in a horizontal plane "H" (shown in FIG. 5) to the position shown in FIG. 5 to provide access to the back end 18 of the housing 10. Rough boring and face milling tools are sequentially inserted into the housing 10 through the back end 18 while the air/oil mist is sprayed onto the housing through the internal passages in the tools 12. Again, a large volume of chips 44 are removed from the housing 10 and a substantial amount of the heat created by the process and retained in the machining chips 44 is removed through the fluid drainage holes 22 in the bottom side 20 of the housing 10.

Figure 6:
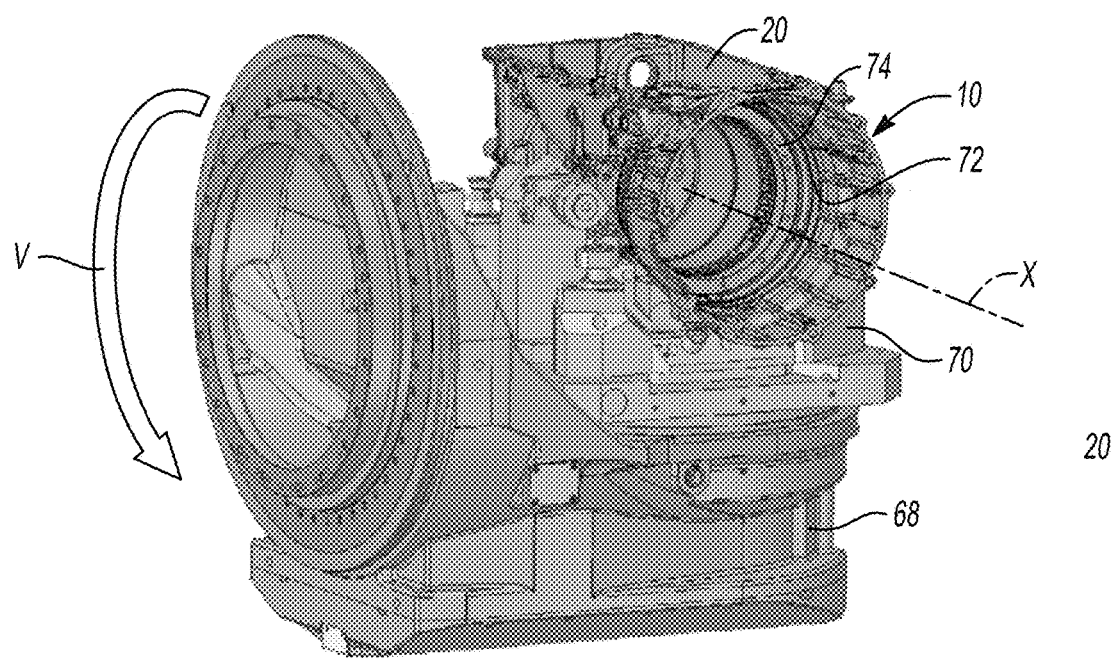
FIG. 6 is a perspective view of a trundle of a machining center holding a transmission housing in a bottom up orientation.

The housing is then transferred to a plurality of machining centers, at 58, and repositioned by being pivoted in a vertical plane "V" (shown in FIG. 6) to the position shown in FIG. 6 with the fluid drainage holes 22 in the bottom side 20 of the housing 10 facing upward. The bottom side 20 of the housing 10 is milled, drilled and tapped to form ports, passageways and other features of the housing 10 in several machining centers. The machining centers used to mill, drill and tap the housing remove only a limited volume of chips and can utilize MQL systems because less material is removed.

The next step is to transfer the housing to a finish boring and face milling station at 60. The housing is pivoted in a vertical plane "V" to the position shown in FIG. 4 with the fluid drainage holes on the bottom side 20 of the housing 10 facing downward. Boring and face milling tools are used to machine smooth surfaces on the inside bores and faces of the housing 10. The air/oil mist 34 is directed onto the housing as the tools machine the bell-shaped end of the housing 10.

The housing 10 is again pivoted 180° in a horizontal plane "H" to the position shown in FIG. 5 within the machining station. Finish boring and face milling tools 12 are sequentially inserted into the housing 10 through the back end 18 while the air/oil mist is sprayed onto the housing through the internal passages in the tools 12. A large volume of chips is again removed from the housing but the volume of chips is less than what was removed in the rough boring and face milling operation. The chips 44 and air/oil mist 34 are directed by the compressed air/oil mist and the force of gravity through the fluid drainage holes in the bottom side 20 of the housing 10.

After the finish boring and face milling operation the housing 10 is transferred to a high pressure wash operation at 62 to clean the housing 10 and remove any residue of the air/oil mist 34 and machining chips 44.

The housing is then dehydrated and leak tested at 64 and is unloaded from the line 50 at an unloading station 66.

Referring to FIG. 4, a trunnion 68 is illustrated that is part of the machining centers making up the machining line 50. The housing 10 in FIG. 4 is held on the datums 76 used to locate the housing in a fixture 70, or positioner, with the bottom side 20 facing downward. In this position, the fluid drainage holes 22 are in a position to allow the machining chips 44 and excess air/oil mist 34 to fall through the fluid drainage holes 22 with the fluid drainage holes 22 being disposed below the central axis "X." In FIG. 4, internal bores 72 and faces 74 are illustrated that are formed by the boring and face milling tools (as shown in FIG. 1).

Referring to FIG. 5, the trunnion 68 is shown with an arcuate arrow "H" to illustrate the horizontal pivoting motion in which the housing is pivoted to allow access to either the bell-shaped end or the back end of the housing 10. The housing 10 is retained in the fixture 70 with the bottom side 20 facing downward.

Referring to FIG. 6, the trunnion 68 is shown with the housing 10 shown with the bottom side 20 facing upward and disposed above the central axis "X." The housing 10 is retained in the fixture 70 and the bores 72 and faces 74 are also shown. The trunnion 68 pivots the housing in the vertical plane indicated by the arcuate arrow "V."

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A method of manufacturing a transmission housing comprising:
   positioning a cast housing with a plurality of fluid drainage holes below a central axis of the cast housing;
   boring and face milling a plurality of internal bores and a plurality of faces of the housing to form a rough machined housing; and
   blowing machining chips off of the rough machined housing through the fluid drainage holes.

2. The method of claim 1 wherein the step of boring and face milling the internal bores and faces further comprises:
   supplying a cutting head with a compressed air/oil mist through an internal passage in the cutting head; and
   spraying the compressed air/oil mist through the cutting head to cool and lubricate boring and face milling tools.

3. The method of claim 2 wherein the housing includes a bell-shaped end and a rear end, the method further comprising:
   controlling the compressed air/oil mist to allow flow when the cutting head is within the housing and inhibit flow during a tool change operation when the cutting head is outside the housing; and
   blowing machining chips off of the machined housing through the bell-shaped end of the machined housing after the step of boring and face milling a plurality of internal bores and a plurality of faces on the housing.

4. The method of claim 3 wherein during the step of controlling the compressed air/oil mist, the method further comprises stopping an oil mist portion of the compressed air/oil mist and continuing to provide a flow of compressed air for cooling the housing during tool retraction.

5. The method of claim 1 further comprising:
   locating the rough machined housing on a plurality of datums with the fluid drainage holes above a central axis of the cast housing; and
   boring and face milling the rough machined housing with a compressed air/oil mist through a finish cutting tool, wherein chips removed from the housing fall through the fluid drainage holes as a result of gravity.

6. The method of claim 1 wherein the housing includes a bell-shaped end and a rear end, the method further comprising:
   positioning the housing with the bell-shaped end facing a machine tool arbor;
   repositioning the housing with the rear end facing the machine tool arbor; and
   boring a rear bore of the housing.

7. The method of claim 1 wherein the step of boring and face milling a plurality of internal bores and a plurality of faces of the cast housing to form a rough machined housing is performed by a computer numerically controlled machining center with a tool magazine, wherein the method further comprises:
rotating a cutting head to create turbulence that blows chips off of the housing.

8. The method of claim 1 wherein the step of boring and face milling a plurality of internal bores and a plurality of faces of the housing to form a rough machined housing is performed by boring tools and interpolating face milling tools that have a diameter of between 205 mm and 295 mm.

9. The method of claim 1 further comprising:
positioning the machined housing with the fluid drainage holes above a central axis of the machined housing;
milling the machined housing with the fluid drainage holes above a central axis of the machined housing;
drilling the machined housing with the fluid drainage holes above a central axis of the machined housing;
tapping the machined housing with the fluid drainage holes above a central axis of the machined housing;
positioning the machined housing with the fluid drainage holes below a central axis of the machined housing;
boring and face milling a plurality of internal bores and a plurality of faces on the rough machined housing with finish boring and face milling operation to form a finish machined housing; and
blowing machining chips off of the finish machined housing through the fluid drainage holes.

10. A machining center comprising:
a fixture holding a housing defining a plurality of drainage holes oriented below a central axis of the housing;
a plurality of interchangeable tools boring and face milling a plurality of bores and faces of the housing; and
a lubrication system lubricating and cooling the interchangeable tools with a compressed air/oil mist while boring and face milling the housing and blowing machining chips off the housing through the drainage holes.

11. The machining center of claim 10 wherein the lubrication system includes flow channels defined by the interchangeable tools.

12. The machining center of claim 10 wherein the interchangeable tools include boring tools, interpolated face milling tools, and interpolated grooving tools.

13. The machining center of claim 10 wherein the lubrication system includes a controller that allows the compressed air/oil mist to flow when the interchangeable tool is in the housing and inhibits the flow of an oil mist portion of the compressed air/oil mist during a tool change.

14. The machining center of claim 13 wherein the compressed air/oil mist is limited to a flow of compressed air that blows machining chips off the housing while the interchangeable tool is retracted from the housing.

15. The machining center of claim 10 wherein the housing includes a bell-shaped end and a rear end, the machining center further comprising:
a positioner adapted to change an orientation of the housing, wherein the bell-shaped end is facing a machine tool arbor when a plurality of bores and faces are bored and face milled, and wherein the rear end is facing the machine tool arbor when a rear bore of the housing is bored.

16. The machining center of claim 15 wherein the interchangeable tools include boring tools, interpolated face milling tools, and interpolated grooving tools for machining internal surfaces of the housing that are between 205 mm and 295 mm in diameter.

17. The machining center of claim 10 in combination with a finish machining center, wherein the fixture holding the housing defining the plurality of drainage holes is oriented below the central axis of the housing, the finish machining center further comprising:
a plurality of interchangeable finish cutting tools for finish boring and face milling the plurality of bores and faces of the housing, wherein the lubrication system lubricates and cools the interchangeable finish cutting tools with the compressed air/oil mist in a finish machining operation and blows machining chips off the housing through the drainage holes and through a bell-shaped end of the housing.

18. The machining center of claim 10 wherein the interchangeable tools are rotated when not boring and face milling the housing to create turbulent air flow to remove chips from the housing.

* * * * *